US012056943B2

(12) United States Patent
Zhang (10) Patent No.: US 12,056,943 B2
(45) Date of Patent: Aug. 6, 2024

(54) OBJECT RECOGNITION METHOD AND SYSTEM, AND READABLE STORAGE MEDIUM

(71) Applicants: Beijing BOE Optoelectronics Technology Co., Ltd., Beijing (CN); BOE Technology Group Co., Ltd., Beijing (CN)

(72) Inventor: Menglei Zhang, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 280 days.

(21) Appl. No.: 17/507,609

(22) Filed: Oct. 21, 2021

(65) Prior Publication Data
US 2022/0147732 A1 May 12, 2022

(30) Foreign Application Priority Data
Nov. 11, 2020 (CN) .......................... 202011252427.2

(51) Int. Cl.
*G06V 20/64* (2022.01)
*G06T 3/4007* (2024.01)
(Continued)

(52) U.S. Cl.
CPC ............ *G06V 20/64* (2022.01); *G06T 3/4007* (2013.01); *G06T 3/4046* (2013.01); *G06T 7/50* (2017.01);
(Continued)

(58) Field of Classification Search
CPC ....... G06T 3/4007; G06T 3/4046; G06T 7/50; G06T 2207/20016; G06T 2207/20084;
(Continued)

(56) References Cited

U.S. PATENT DOCUMENTS

| 2021/0056363 A1* | 2/2021 | Song .......................... G06T 7/10 |
| 2021/0183083 A1* | 6/2021 | Yan .......................... G06N 3/045 |
| 2023/0040091 A1* | 2/2023 | Habili ........................ A61F 9/08 |

FOREIGN PATENT DOCUMENTS

CN   110232326 A  *  9/2019

OTHER PUBLICATIONS

Wang, E. K., Chen, C. M., Hassan, M. M., & Almogren, A. (2020). A deep learning based medical image segmentation technique in Internet-of-Medical-Things domain. Future Generation Computer Systems, 108, 135-144. (Year: 2020).*

(Continued)

*Primary Examiner* — Andrae S Allison
*Assistant Examiner* — Emmanuel Silva-Avina
(74) *Attorney, Agent, or Firm* — IPro, PLLC (57) ABSTRACT

An object recognition method, an object recognition system, and a readable storage medium are provided. The object recognition method is to recognize an object from a first image, and includes: acquiring a first image; calculating depth information of the first image; performing superpixel segmentation on the first image, to obtain a superpixel image; generating three-dimensional image data of the first image according to the depth information and the image data of the superpixel image; and inputting the three-dimensional image data into a depth neural network for object recognition, to obtain a recognition result.

14 Claims, 4 Drawing Sheets

(51) Int. Cl.
*G06T 3/4046* (2024.01)
*G06T 7/50* (2017.01)
*G06V 10/46* (2022.01)

(52) U.S. Cl.
CPC .. *G06V 10/462* (2022.01); *G06T 2207/20016* (2013.01); *G06T 2207/20084* (2013.01)

(58) Field of Classification Search
CPC ......... G06T 7/11; G06T 7/187; G06T 3/4038; G06N 3/0455; G06N 3/045; G06N 3/082; G06V 20/64; G06V 10/462; G06V 20/647; G06V 10/82; G06V 10/46; G06F 18/254; G06F 18/253; G06F 18/23; G06F 18/214
USPC ....................................................... 382/181
See application file for complete search history.

(56) References Cited

OTHER PUBLICATIONS

Turgutlu, Karem (2018). Semantic Segmentation—U-Net, medium.com blog (Year: 2018).*

* cited by examiner

OBJECT RECOGNITION METHOD AND SYSTEM, AND READABLE STORAGE MEDIUM

CROSS-REFERENCE TO RELATED APPLICATIONS

This application claims priority to Chinese Patent Application No. 202011252427.2 filed in China on Nov. 11, 2020, the entire contents of which are hereby incorporated by reference.

TECHNICAL FIELD

The present disclosure relates to the technical field of artificial intelligence. More particularly, the present disclosure relates to an object recognition method and system, and a readable storage medium.

BACKGROUND

In the related art, the detection and recognition of an object in an image (for example, an object such as a commodity in a monitoring image of an unmanned supermarket) are mostly based on a two-dimensional image; firstly, a target object is marked in the two-dimensional image and used as a training set to train a depth neural network; and then the trained depth neural network can be used to perform object recognition on the acquired image. However, the above-mentioned method has the problems of low recognition accuracy, a large number of parameters of a network model, and a slow recognition speed. For example, for targets with similar shapes but different volumes (e.g. beverages of the same brand in a 2 L package and a 500 mL package), since the image features (e.g. RGB values, etc.) of a two-dimensional image cannot directly reflect the volume of the target, the above-mentioned method cannot finely recognize differences between these targets, and thus is prone to recognition errors.

SUMMARY

An object of the present disclosure is to provide an object recognition method and system, and a readable storage medium.

In order to achieve the above object, the present disclosure adopts the following technical solutions.

In a first aspect, the present disclosure provides an object recognition method for recognizing an object from a first image, including:
  acquiring a first image;
  calculating depth information of the first image;
  performing superpixel segmentation on the first image, to obtain a superpixel image;
  generating three-Dimensional (3D) image data of the first image according to the depth information and the image data of the superpixel image; and
  inputting the three-dimensional image data into a depth neural network for object recognition, to obtain a recognition result.

Optionally, the performing the superpixel segmenting on the first image includes:
  extracting a texture feature of a pixel point of the first image, and performing the superpixel segmentation on the first image according to the texture feature of the pixel point.

Optionally, the performing the object recognition includes:
  performing, by the depth neural network, multiple down-samplings on the inputted three-dimensional image data by using multiple down-sampling layers, and then performing, by the depth neural network, multiple up-samplings by using multiple up-sampling layers,
  wherein an input of a first up-sampling layer in the multiple up-sampling layers is a feature pattern obtained after performing at least one convolution operation on an output of a last one down-sampling layer, and an input of another up-sampling layer in the multiple up-sampling layers is a feature pattern obtained by splicing a feature pattern corresponding to the down-sampling layer corresponding to the other up-sampling layer and a feature pattern outputted by the previous up-sampling layer.

Optionally, each of the multiple up-samplings includes:
  performing interpolating up-sampling on one part of channels randomly selected from a feature pattern of an input up-sampling layer and performing up-sampling with transposed convolution on the other part of channels.

Optionally, each of the multiple up-samplings includes:
  performing the interpolating up-sampling on one half of channels randomly selected from a feature pattern of an input up-sampling layer and performing the up-sampling with the transposed convolution on the other half of channels.

Optionally, the down-sampling layer includes at least one convolution layer and one pooling layer; the first up-sampling layer in the multiple up-sampling layers includes an interpolation module and a transposed convolution layer, and the other up-sampling layer includes an interpolation module, a transposed convolution layer and at least one convolution layer.

Optionally, the first image is acquired by a binocular camera, and the calculating the depth information of the first image includes:
  calculating a depth value of each of coordinate points in the acquired first image according to an acquisition parameter of the binocular camera, and performing normalization processing on the depth values of all of the coordinate points to obtain depth information about the first image.

Optionally, the method further includes:
  acquiring a training sample carrying a label, wherein the training sample is a superpixel image labeled with a target edge; and
  establishing a training set according to the training sample, and performing training by using the training set to obtain the deep neural network.

In a second aspect, the present invention provides an object recognition system, including: an image acquisition device, a memory, a processor, and a computer program stored in the memory and capable of being executed by the processor, wherein the image acquisition device is configured for acquiring a first image, and the processor is configured to execute the computer program to implement steps of:
  calculating depth information of the first image;
  performing superpixel segmentation on the first image, to obtain a superpixel image;
  generating three-dimensional image data of the first image according to the depth information and the image data of the superpixel image; and inputting the three-dimensional image data into a depth neural network for object recognition, to obtain a recognition result.

Optionally, the image acquisition device is a binocular camera.

Optionally, the performing the superpixel segmenting on the first image includes:

extracting a texture feature of a pixel point of the first image, and performing the superpixel segmentation on the first image according to the texture feature of the pixel point.

Optionally, the performing the object recognition includes:

performing, by the depth neural network, multiple down-samplings on the inputted three-dimensional image data by using multiple down-sampling layers, and then performing, by the depth neural network, multiple up-samplings by using multiple up-sampling layers, wherein an input of a first up-sampling layer in the multiple up-sampling layers is a feature pattern obtained after performing at least one convolution operation on an output of a last one down-sampling layer, and an input of another up-sampling layer in the multiple up-sampling layers is a feature pattern obtained by splicing a feature pattern corresponding to the down-sampling layer corresponding to the other up-sampling layer and a feature pattern outputted by the previous up-sampling layer.

Optionally, each of the multiple up-samplings includes:

performing interpolating up-sampling on one part of channels randomly selected from a feature pattern of an input up-sampling layer and performing up-sampling with transposed convolution on the other part of channels.

Optionally, each of the multiple up-samplings includes:

performing the interpolating up-sampling on one half of channels randomly selected from a feature pattern of an input up-sampling layer and performing the up-sampling with the transposed convolution on the other half of channels.

Optionally, the down-sampling layer includes at least one convolution layer and one pooling layer; the first up-sampling layer in the multiple up-sampling layers includes an interpolation module and a transposed convolution layer, and the other up-sampling layer includes an interpolation module, a transposed convolution layer and at least one convolution layer.

Optionally, the first image is acquired by a binocular camera, and the calculating the depth information of the first image includes:

calculating a depth value of each of coordinate points in the acquired first image according to an acquisition parameter of the binocular camera, and performing normalization processing on the depth values of all of the coordinate points to obtain depth information about the first image.

Optionally, the processor is further configured to execute the computer program to implement steps of:

acquiring a training sample carrying a label, wherein the training sample is a superpixel image labeled with a target edge; and establishing a training set according to the training sample, and performing training by using the training set to obtain the deep neural network.

In a third aspect, the present disclosure provides a computer readable storage medium having stored thereon a computer program, wherein the computer program is configured to be executed by a processor to implement the object recognition method provided in the first aspect of the present disclosure.

BRIEF DESCRIPTION OF THE DRAWINGS

Embodiments of the present disclosure will now be further described in detail with reference to the accompanying drawings.

DETAILED DESCRIPTION

In order to make the present disclosure more clearly, the present disclosure will now be further described with reference to the embodiments and the accompanying drawings. Like parts in the drawings are denoted by the same reference numerals. It is to be understood by persons of ordinary skill in the art that the following detailed description is intended to be illustrative and not restrictive, and that it is not intended to limit the scope of the present disclosure.

Figure 1:
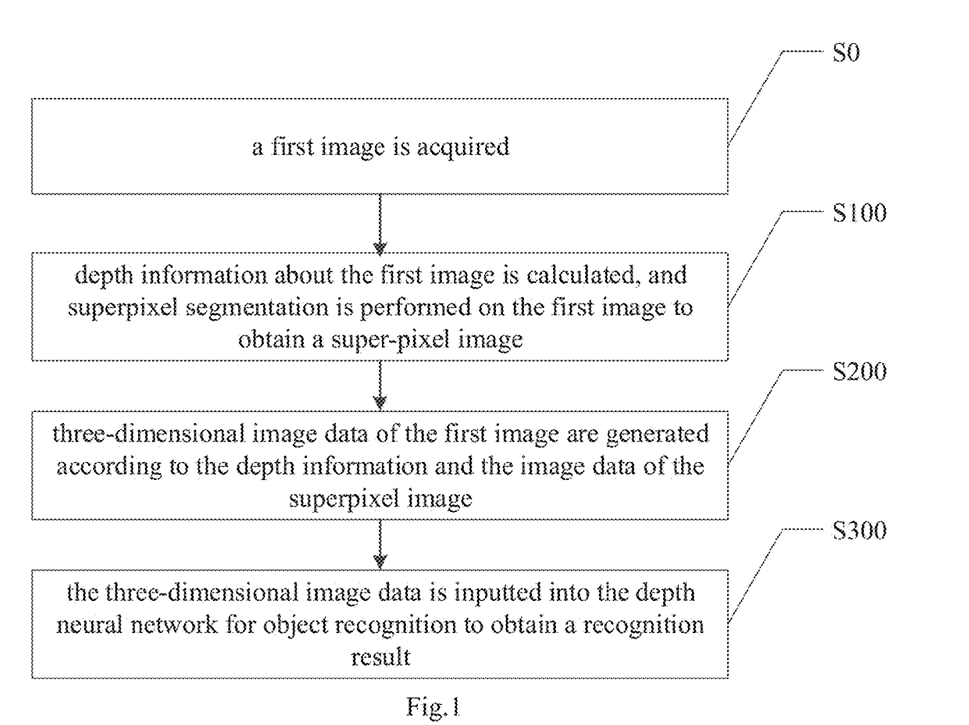
FIG. 1 is a flowchart diagram of an object recognition method provided by an embodiment of the present disclosure.

As shown in FIG. 1, an embodiment of the present disclosure provides an object recognition method for recognizing an object from a first image, and includes the following steps.

At step S0, a first image is acquired. In a possible implementation, the first image is acquired by a binocular camera. The binocular camera is a 3D camera, which differs significantly from a two-Dimensional (2D) camera in that, in addition to planar images, it can acquire depth-related information of a photographed subject.

At step S100, depth information about the first image is calculated, and superpixel segmentation is performed on the first image to obtain a super-pixel image.

In a possible implementation, the step of calculating depth information of the first image includes: a depth value of each coordinate point in the acquired first image is calculated according to an acquisition parameter of the binocular camera, and normalization processing is performed on the depth values of all the coordinate points to obtain depth information about the first image.

Thus, the depth information of the first image can be accurately and efficiently calculated as the three-dimensional information of subsequent generated three-dimensional image data by using the relatively simple binocular camera to acquire the first image without the aid of other devices such as an infrared sensor, and the three-dimensional information is relatively simple and the amount of calculation data is small.

In one specific example, the process of calculating the depth value of each coordinate point in the acquired first image according to the acquisition parameters of the binocular camera may be implemented as follows:

after the first image is acquired by using the binocular camera, a depth value of each coordinate point in the first image is determined according to an acquisition parameter (or an internal parameter of the camera) of the binocular camera, and the depth value serves as depth data corresponding to the coordinate point of the original first image. Here, the depth values of all coordinate points are normalized, and the depth value is taken as a new channel.

Figure 2:
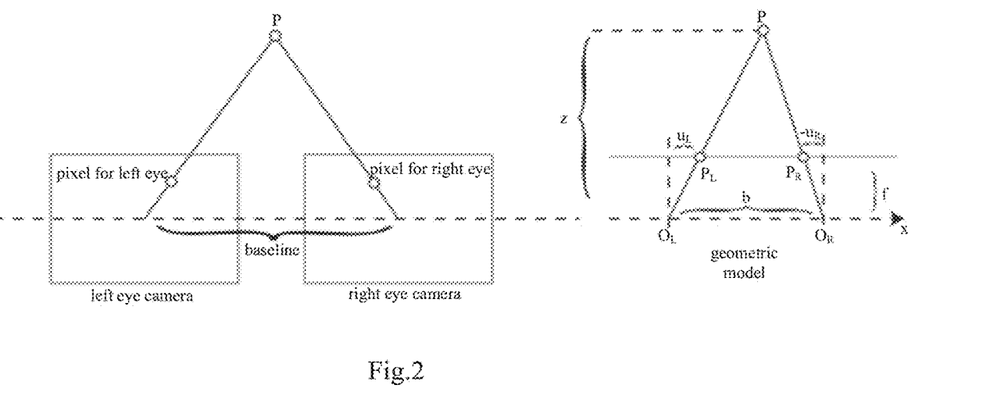
FIG. 2 is a schematic diagram of geometrical parameters of a binocular camera.

For example, the calculation method of depth value is as follows:

parallax d is calculated: $d=u_L-u_R$, where $u_L$ and $u_R$ are the coordinates of the target P point on the left and right views as shown in FIG. 2, respectively;

the depth value z is calculated: $z=(f-b)/d$, where f is the focal length of the binocular camera and b is the binocular baseline length of the binocular camera, as shown in FIG. 2.

In a possible implementation, the process of performing superpixel segmentation on the first image includes: a texture feature of a pixel point of the first image is extracted, and the superpixel segmentation is performed on the first image according to the texture feature of the pixel point.

Thus, the first image can be segmented into small regions consisting of a series of adjacently located pixels with similar texture features by the superpixel segmentation based on the texture features of the pixels. These small regions retain useful information for further image segmentation without destroying the edge information of objects in the image.

Texture is a visual feature that reflects the homogeneity in the image, and reflects a surface structure organization arrangement property with slow change or periodic change of an object surface. Texture has three major marks: some local sequence repeated continuously, non-randomly arranged, and an entity that is roughly uniform in texture region. Texture is different from image features such as grayscale and color, and it is represented by the grayscale distribution of pixels and their surrounding spatial neighborhoods, namely: local texture information. The local texture information has different degrees of repeatability, namely, global texture information.

Texture features can be divided into four types:

(1) Statistical Texture Features.

Based on the gray properties of the pixels and their neighborhoods, the statistical features in the texture region, or the first-order, second-order or higher-order statistical features of the grey levels of the pixels and their neighborhoods are studied. A Grey-Level Co-occurrence Matrix (GLCM) is mainly used in statistical texture feature, which is a method based on estimating the second-order combined conditional probability density of images. The GLCM mainly describes the probability that a pair of pixels separated by a distance of d pixels have the gray values i and j, respectively, in a theta direction.

(2) Model Texture Features.

It is hypothesized that the texture is formed in a distributed model controlled by some parameters, the model parameters are estimated and calculated from the realization of the texture image, and the image segmentation is performed based on the characteristics of the parameters or some strategies. Therefore, the estimation of the model parameters is the core problem of this method. The model texture feature extraction method is mainly a random field method and a fractal method.

Random field model method: probabilistic models are used to describe texture random processes, which perform statistical operations on random data or random features to estimate texture model parameters, and then cluster a series of model parameters to form model parameters consistent with the number of texture types. A point-by-point maximum posterior probability estimation is performed on the gray image by the estimated model parameters, and the probability that the pixel is most likely to belong to in the case of a pixel and its neighborhood is determined. The random field model actually describes the statistical dependence of pixels in an image on neighboring pixels.

Fractal model method: as an important feature and measure of fractal, fractal dimension combines spatial information and gray information of an image simply and organically, so it has attracted much attention in image processing. The application of fractal dimension in image processing is based on two points as follows: (a) morphological substances of different types in nature generally have different fractal dimensions; (b) due to the hypothesis of researchers, there is a certain correspondence between fractal in nature and gray representation of images. Studies show that a human visual system has a close relationship between the fractal dimension and the perception of roughness and concavity and convexity. Therefore, the fractal dimension of an image region can be used to describe the texture features of the image region. A core problem of describing texture with fractal dimension is how to estimate fractal dimension accurately.

(3) Signal Processing Texture Features.

Based on time-domain analysis, frequency-domain analysis and multi-scale analysis, after a certain transformation is carried out in a certain region of the texture image, a relatively stable eigenvalue is extracted, and then the eigenvalue is used as a feature to represent the consistency within the region and the dissimilarity between regions. The texture feature of signal processing class is mainly to transform texture into a transform domain by using some kinds of linear transformation, filters or filter banks, and then extract texture feature by applying some kind of energy criterion. Therefore, the signal processing-based method is also referred to as a filtering method. Most signal processing methods have been proposed based on the hypothesis that the energy distribution in the frequency domain enables texture discrimination.

(4) Structural Texture Features.

It analyzes texture features based on "texture primitives", focuses on finding texture primitives, it is considered that texture consists of many texture primitives, and the expression of texture is determined by different types of texture primitives, different directions and numbers.

In addition, the superpixel segmentation in the present embodiment can also be realized based on the characteristics such as the color and brightness of pixel points.

In a specific example, the process of performing superpixel segmentation on the first image to obtain a superpixel image may be implemented as follows.

An original first image (a two-dimensional image, a left view or a right view) acquired by the binocular camera is segmented into superpixels by using a superpixel algorithm according to texture features of the first image, for example, the texture feature of the first image is extracted, the first image is subjected to superpixel segmentation according to an edge where the texture feature changes, and each unit obtained by the superpixel segmentation is a superpixel. For each superpixel, a coordinate position of the superpixel (including a center coordinate of the superpixel and a coordinate of an original pixel point included in the superpixel) is recorded.

When superpixel segmentation is performed, an edge obtained by superpixel segmentation can be marked (marking along an edge of an object), and a superpixel within an object boundary is marked as a corresponding class, namely, if a certain superpixel is within an object boundary in an original image, the superpixel is marked as a corresponding object class, otherwise, the superpixel is marked as a background. In this way, markers at the time of superpixel segmentation can be used to assist in subsequent object recognition.

It should be noted that in step S100, an execution order of "calculating the depth information of the first image" and "performing superpixel segmentation on the first image" is not limited, that is, firstly "calculating the depth information of the first image" and then "performing super-pixel segmentation on the first image", or firstly "performing superpixel segmentation on the first image" first and then "calculating the depth information of the first image", or both may be executed in parallel.

And after step S100, the first image (for example, an RGB image) can be represented as three-dimensional image data (for example, a superpixel matrix graph) containing depth information and two-dimensional image features (for example, RGB values), wherein the two-dimensional image features and the depth information serve as a channel of the superpixel, and thus the image information about the original first image of a larger size can be converted into image information with a higher dimension and a smaller size, and the size can be reduced without sacrificing the image features, so as to reduce the number of parameters of the network model of the depth neural network.

At step S200, as described above, three-dimensional image data of the first image are generated according to the depth information and the image data of the superpixel image, thereby achieving the splicing of two-dimensional information (e.g., RGB values, etc.) of the image with three-dimensional information (depth information).

At step S300, the three-dimensional image data is inputted into the depth neural network for object recognition to obtain a recognition result;

In a possible implementation, the step of performing object recognition includes: the depth neural network performs multiple down-samplings on the inputted three-dimensional image data by using multiple down-sampling layers and performs multiple up-samplings by using multiple up-sampling layers, wherein an input of the first up-sampling layer in the multiple up-sampling layers is a feature pattern obtained after performing at least one convolution operation on an output of the last down-sampling layer, and an input of the other up-sampling layers is a feature pattern obtained by splicing a feature pattern corresponding to the corresponding down-sampling layer and a feature pattern outputted by the previous up-sampling layer.

Thus, the depth neural network with a simple structure and being able to adapt to a very small training set can be configured for object recognition, wherein the input of the up-sampling layer is a feature pattern obtained by splicing the feature pattern corresponding to the corresponding down-sampling layer and a feature pattern outputted by the previous up-sampling layer, it can combine deep-level feature and shallow-level feature, refine an image, obtain features on different dimensions of the first image, and then improve the effect of image segmentation and object recognition.

In a specific example, the deep neural network employed in an optional way is a U-Net, the specific network structure of which is described below.

Figure 3:
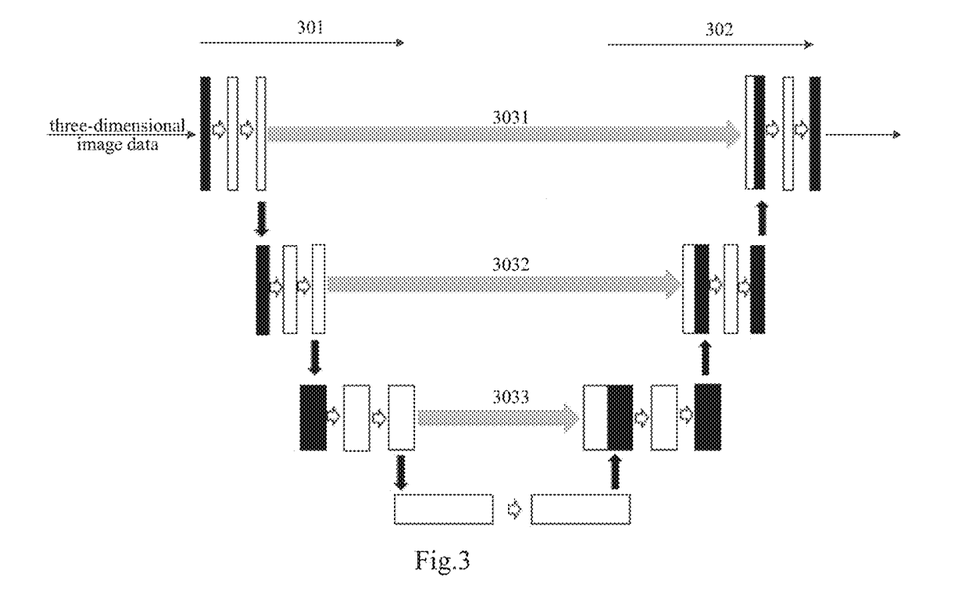
FIG. 3 is a schematic diagram of a network structure of a deep neural network.

The U-Net, as the name implies, has a U-shaped network structure, as shown in FIG. 3, which is essentially an improved full-convolution neural network. The U-Net includes an encoder network 301 for down-sampling and a decoder network 302 for up-sampling, wherein an input image is subjected to multiple times of convolution reduction by the encoder network 301 to obtain multiple feature patterns, and then is subjected to multiple times of deconvolution expansion by the decoder network 302, and in this process, the input image is correspondingly spliced with the multiple feature patterns corresponding to the encoder network 301 so as to combine deep-level and shallow-level features to refine the image, so as to obtain features on different dimensions of the input image, thereby improving the effect of image segmentation and object recognition. If the sizes of the two feature patterns to be spliced are different, after being copied, the feature pattern corresponding to the encoder network 301 needs to be cropped and then transmitted to the decoder network 302 for splicing.

As shown in FIG. 3, in this example, in order from shallow to deep, the encoder network 301 includes three down-sampling layers and the decoder network 302 includes three up-sampling layers. It should be noted that the number of down-sampling layers and the number of up-sampling layers are not limited to three, but the number of down-sampling layers and the number of up-sampling layers should be the same.

Between the encoder network 301 and the decoder network 302, three feature propagation layers 3031, 3032 and 3033 are established in order from shallow to deep (top to bottom on the left in FIG. 3).

It should be noted that the U-Net may further include a classification layer (not shown in the figure) after the decoder network 302 is set, and the classification of the pixel points in the feature pattern corresponding to the three-dimensional image data can be achieved by setting a classifier to calculate the probability of the pixel points belonging to different classes in the feature pattern corresponding to the three-dimensional image data, thereby performing pixel point classification, namely, image segmentation, so as to achieve object recognition.

With regard to the encoder network 301, feature extraction of three-dimensional image data can be performed through several (e.g. three) down-sampling layers, and a feature pattern obtained by performing feature extraction can be transmitted to the decoder network 302 via three feature propagation layers 3031, 3032 and 3033.

Specifically, in this example, the down-sampling layer includes two convolution layers and one pooling layer, and the pooling layer is the maximum pooling layer. The three-dimensional image data are inputted into the shallowest down-sampling layer (the top left side in FIG. 3) in the encoder network 301; convolution processing is performed on the inputted three-dimensional image data via the shallowest down-sampling layer (two convolutions as shown in FIG. 3) to obtain a feature pattern corresponding to the shallowest down-sampling layer; and the feature pattern is inputted into the next shallower down-sampling layer after the down-sampling processing (the maximum pooling down-sampling processing).

The other two down-sampling layers in the encoder network 301 are traversed in the order from shallow to deep (top to bottom on the left in FIG. 3) to obtain the corresponding feature patterns traversed to the other two down-sampling layers.

Between the encoder network 301 and the decoder network 302, feature propagation of the above-described feature pattern is performed via feature propagation layers 3031, 3032 and 3033, respectively.

After the output of the deepest down-sampling layer is convolved (shown by the lowest horizontal hollow arrow in FIG. 3), the feature pattern is transmitted directly to the deepest up-sampling layer in the decoder network 302 (shown by the lowest right upward solid arrow in FIG. 3).

In the encoder network 301, the horizontal hollow arrow indicates the convolution processing by the convolution layer and the downward solid arrow indicates the maximum pooling down-sampling processing by the maximum pooling layer.

As layers of the encoder network are deepened, in the feature extraction of the three-dimensional image data, the local description is gradually abstracted to the global description, and then the three-dimensional image data is more accurately described, so as to help to ensure the accuracy of image segmentation.

For the decoder network 302, not only the feature extraction of the three-dimensional image data is performed through several up-sampling, but also the feature fusion is performed on the three-dimensional image data.

Specifically, in this example, the first up-sampling layer (the deepest up-sampling layer) includes a transposed convolution layer (transposed convolution is also called deconvolution, or up-convolution), and the other up-sampling layers include a transposed convolution layer and two convolution layers. The deepest up-sampling layer performs transposed convolution up-sampling processing on the feature pattern obtained after convolution processing is performed on the output of the deepest down-sampling layer to obtain a first feature pattern to be fused.

The first feature pattern to be fused is inputted into a next deepest up-sampling layer, and subjected to convolution processing (two convolutions as shown in FIG. 3) after being fused with the feature pattern corresponding to the deepest down-sampling layer transmitted by the transmission layer 3033 so as to obtain a second feature pattern to be fused.

The other two up-sampling layers are traversed in the order from deep to shallow (from the right side to the top in FIG. 3) to obtain a feature pattern corresponding to traversed up-sampling layers.

After traversing is completed, a feature pattern corresponding to the three-dimensional image data is obtained from a feature pattern corresponding to the shallowest up-sampling layer.

In the decoder network 302, the horizontal hollow arrow indicates convolution processing by the convolution layer, and upward solid arrow indicates transposed convolution up-sampling processing by the transposed convolution layer.

Through the above process, by combination of the encoder network and the decoder network, the calculated amount of image segmentation is effectively reduced, the segmentation efficiency is improved, and the accuracy of image segmentation is fully guaranteed.

In a possible implementation, each of the multiple up-samplings includes performing interpolating up-sampling on a part of channels randomly selected from a feature pattern of an input up-sampling layer and performing up-sampling with transposed convolution on the other part of channels.

In this implementation, the adoption of an up-sampling method of interpolation and transposed convolution random splicing can further reduce the number of network model parameters and improve the recognition speed while ensuring the accuracy of image segmentation and object recognition.

In a possible implementation, each of the multiple up-samplings includes performing interpolating up-sampling on one half of channels randomly selected from a feature pattern of an input up-sampling layer and performing up-sampling with transposed convolution on the other half of channels.

Thus, the number of the network model parameters can be reduced and the efficiency of the recognition speed can be improved.

In a possible implementation, the down-sampling layer includes at least one convolution layer and one pooling layer; a first up-sampling layer of the multiple up-sampling layers includes an interpolation module and a transposed convolution layer, and other up-sampling layers include an interpolation module, a transposed convolution layer and at least one convolution layer.

In one specific example, the above-described depth neural network employing the up-sampling method of interpolation and transposed convolution random splicing can be considered as an improvement on the previously described U-Net, and can be understood as replacing the transposed convolution up-sampling processing in the U-Net with an up-sampling processing employing interpolation and transposed convolution random splicing.

Figure 4:
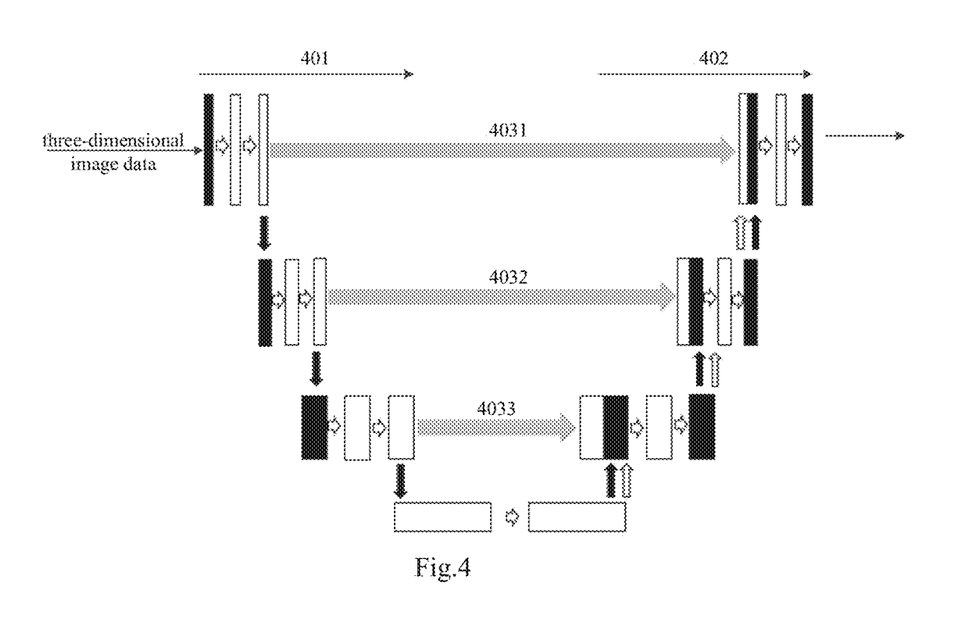
FIG. 4 is a schematic diagram of a modified network structure of the depth neural network shown in FIG. 3.

In a specific example, the network structure of the above-mentioned improved depth neural network is as shown in FIG. 4, which includes an encoder network 401 for down-sampling and a decoder network 402 for up-sampling, wherein an input image is subjected to multiple times of convolution reduction by the encoder network 401 to obtain multiple feature patterns, and then is subjected to multiple times of expansion based on interpolation and transposed convolution random splicing by the decoder network 402, and in this process, the input image is correspondingly spliced with the multiple feature patterns corresponding to the encoder network 401 so as to combine deep-level and shallow-level features to refine the image, so as to acquire features on different dimensions of the input image, thereby improving the effect of image segmentation and object recognition, and effectively reducing the number of network model parameters and improving the recognition speed.

As shown in FIG. 4, in this example, in order from shallow to deep, the encoder network 401 includes three down-sampling layers and the decoder network 402 includes three up-sampling layers.

Between the encoder network 401 and the decoder network 402, three feature propagation layers 4031, 4032 and 4033 are established in order from shallow to deep.

It should be noted that the above-mentioned improved depth neural network may further include a classification layer (not shown in the figure) after the decoder network 402 is set, and the classification of the pixel points in the feature pattern corresponding to the three-dimensional image data can be achieved by setting a classifier to calculate the probability of the pixel points belonging to different classes in the feature pattern corresponding to the three-dimensional image data, and thus to predict the classes of the pixel points in the feature pattern corresponding to the three-dimensional image data, thereby performing pixel point classification, namely, image segmentation, so as to achieve object recognition.

With regard to the encoder network 401, feature extraction of three-dimensional image data can be performed through three down-sampling layers, and a feature pattern obtained by performing feature extraction can be transmitted to the decoder network 402 via three feature propagation layers 4031, 4032 and 4033.

Specifically, in this example, the down-sampling layer includes two convolution layers and one pooling layer, and the pooling layer is the maximum pooling layer. The three-dimensional image data are inputted into the shallowest down-sampling layer (the top left side in FIG. 4) in the encoder network 401; convolution processing is performed on the inputted three-dimensional image data via the shallowest down-sampling layer (two convolutions as shown in FIG. 4) to obtain a feature pattern corresponding to the shallowest down-sampling layer; and the feature pattern is inputted into the next shallower down-sampling layer after the down-sampling processing (the maximum pooling down-sampling processing).

The other two down-sampling layers in the encoder network 401 are traversed in the order from shallow to deep (top to bottom on the left in FIG. 4) to obtain the corresponding feature patterns traversed to the other two down-sampling layers.

Between the encoder network 401 and the decoder network 402, feature propagation of the above-described feature pattern is performed via feature propagation layers 4031, 4032 and 4033, respectively.

After the output of the deepest down-sampling layer is convolved (shown by the lowest horizontal hollow arrow in FIG. 4), the feature pattern is transmitted directly to the deepest up-sampling layer in the decoder network 402 (shown by the right lowest hollow up arrow and solid up arrow in FIG. 4).

In the encoder network 401, the horizontal hollow arrows indicate the convolution processing by the convolution layer and the downward solid arrows indicate the maximum pooling down-sampling processing by the maximum pooling layer.

For the decoder network 402, not only the feature extraction of the three-dimensional image data is performed through several up-samplings, but also the feature fusion is performed on the three-dimensional image data.

Specifically, in this example, the first up-sampling layer (the deepest up-sampling layer) includes a transposed convolution layer and an interpolation module, and other up-sampling layers include a transposed convolution layer, an interpolation module, and two convolution layers. The deepest up-sampling layer performs interpolation up-sampling processing on one half of channels randomly selected from the feature pattern obtained after convolution processing on the output of the deepest down-sampling layer, and performs transposed convolution up-sampling processing on the other half of channels, so as to obtain a first feature pattern to be fused.

The first feature pattern to be fused is inputted into a next deepest up-sampling layer, and subjected to convolution processing (two convolutions as shown in FIG. 3) after being fused with the feature pattern corresponding to the deepest down-sampling layer transmitted by the transmission layer 4033 so as to obtain a second feature pattern to be fused.

The other two up-sampling layers are traversed according to an order from deep to shallow (from the bottom to the top at right side in FIG. 3) (wherein each up-sampling respectively performs channel random selection) to obtain a feature pattern corresponding to traversed up-sampling layers.

After traversing is completed, a feature pattern corresponding to the three-dimensional image data is obtained from a feature pattern corresponding to the shallowest up-sampling layer.

In the decoder network 402, horizontal hollow arrows indicate convolution processing by the convolution layer, upward solid arrows indicate transposed convolution up-sampling processing by the transposed convolution layer, and upward hollow arrows indicate interpolation up-sampling processing by the interpolation module.

Through the above process, by combination of the encoder network and the decoder network, the calculation of image segmentation is effectively reduced, the segmentation efficiency is improved, the accuracy of image segmentation is fully guaranteed, the number of network model parameters is effectively reduced, the speed for image segmentation and object recognition is improved.

Figure 5:
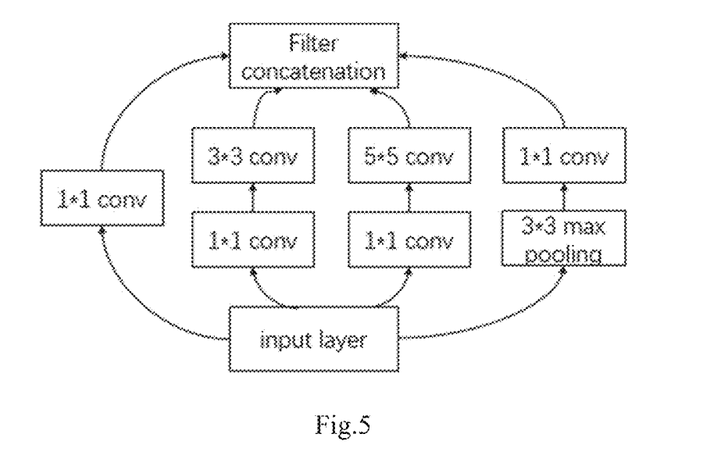
FIG. 5 is a schematic structural diagram of an Inception model.

In the respective network structures shown in FIGS. 3 and 4, the convolution layer can be a basic unit as the Inception model shown in FIG. 5.

In a possible implementation, the step S300 further includes: a recognition result for the first image is obtained according to the recognition result.

Thus, by obtaining the recognition result of the original image according to the recognition result of the superpixel image, a more intuitive and precise recognition result can be obtained, which is convenient for subsequent analysis and verification.

In a specific example, the above-mentioned steps S100-S300, namely, the superpixel segmentation, calculation of depth information and the depth neural network are connected in series to form an overall algorithm service, the camera internal parameters of the binocular camera and the acquired first image are taken as the algorithm input, and the original image corresponding to the superpixel is outputted according to the segmentation result so as to output the object recognition result of the original first image.

In some embodiments, the object recognition method provided by the present embodiment further includes a training step for a deep neural network before performing step S300, and the training step includes:

a training sample carrying a label is acquired, wherein the training sample is a superpixel image labeled with a target edge; and a training set is constructed according to a training sample, and it is trained by using the training set to obtain the deep neural network.

Through the above-mentioned process, the trained depth neural network has the ability to perform image segmentation (or pixel classification) on the corresponding feature pattern of the input image so as to realize object recognition. Then, after the first image is obtained, the obtained three-dimensional image data are inputted into the depth neural network through the processing of steps S100 and S200, and the pixel points in the three-dimensional image data can be classified by the depth neural network so as to realize image segmentation, thereby realizing object recognition.

In a specific example, the present embodiment is applied to an unmanned supermarket scene, and is configured for realizing object recognition of commodities in a monitoring image of the unmanned supermarket, and the present example takes five packaged beverages as an example to perform an effect test, including a first beverage in a 500 mL package, a second beverage in a 500 mL package, a second beverage in a 330 mL package, a third beverage in a 500 mL package and a fourth beverage in a 500 mL package, wherein labels marked are respectively 0-5 classes, and 200 objects are respectively collected in each class (namely, there are several objects in each sample image; and there are a total of 200 beverages of all classes in all the first images) and are used as training samples; all the sample images are divided into a training set, an optimization set and a test set in a ratio of 7:2:1; and an edge contour of each object is marked, and a resolution of single sample image is 2592*1944.

Training process such as: the cross-entropy loss is selected as the loss function of the depth neural network, and the above-mentioned sample images with the labeled target contour and types are inputted for training. A method of SGD+Momentum is used to optimize the training process, the initial learning rate is set to 0.1×(batch size/256), and a method of Cosine Decay is used to gradually reduce the learning rate.

Finally, an Intersection over Union (IoU) is used to measure the segmentation effect of the network model. On the test set, the IoU of each type of object is [0.93, 0.94, 0.91, 0.89, 0.89] respectively.

In summary, the object recognition method provided in the present embodiment takes depth information as a new channel, and uses the depth neural network to realize object recognition by performing image segmentation (namely, object edge extraction, or pixel classification operation) on three-dimensional image data, which can improve the recognition accuracy, in particular, can accurately recognize objects with similar shapes but different volumes; and since an up-sampling method of superpixel segmentation and interpolation and transpose convolution random splicing is used, the number of network model parameters can be reduced and the recognition speed can be improved while ensuring the object recognition accuracy.

Figure 6:
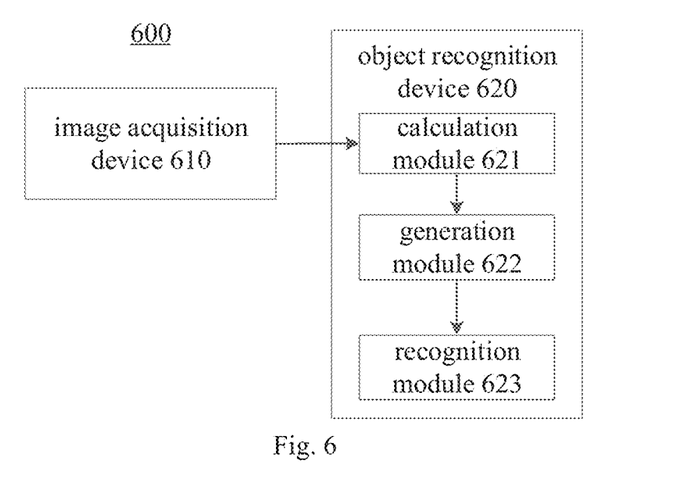
FIG. 6 is a schematic diagram of an object recognition system provided by another embodiment of the present disclosure.

As shown in FIG. 6, another embodiment of the present disclosure provides an object recognition system 600 including an image acquisition device 610 for acquiring a first image and an object recognition device 620, wherein the object recognition device 620 includes:
- a calculation module 621, configured for calculating depth information about a first image, and performing superpixel segmentation on the first image to obtain a superpixel image;
- a generation module 622, configured for generating three-dimensional image data of the first image according to the depth information and the image data of the superpixel image;
- a recognition module 623, configured for inputting the three-dimensional image data into a depth neural network to perform object recognition and obtain a recognition result.

Here, the object recognition device 620 is an electronic device, e.g. a personal computer, a server, etc. that provides a background service for a user, and the background service includes an object recognition service.

It should be noted that, according to the requirements of actual operation, the object recognition device 620 may be a server, may also be a server cluster composed of multiple servers, and may even be a cloud computing center composed of multiple servers, so as to better provide background services to a mass of users, which is not specifically defined herein.

Further, the object recognition device 620 deploys a deep neural network for object recognition.

A wireless or wired network connection is established between the object recognition device 620 and the image acquisition device 610 to enable data transmission between the object recognition systems 600 through the network connection, including connection types such as wired, wireless communication links or fiber optic cables, etc. For example, this data transmission includes a first image, etc. Through the interaction of the image acquisition device 610 with the object recognition device 620, the image acquisition device 610 transmits the acquired first image to the object recognition device 620.

In some embodiments, image acquisition device 610 is a binocular camera.

It should be noted that the process and workflow of the object recognition device 620 in the object recognition system 600 provided by the present embodiment are similar to the object recognition method provided in the previous embodiment, and relevant points can refer to the above descriptions, and will not be repeated here.

Figure 7:
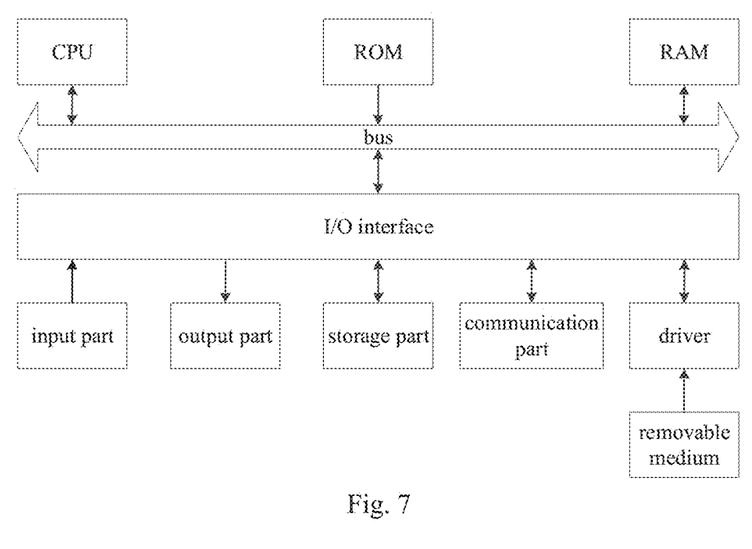
FIG. 7 is a schematic diagram of a computer system implementing the object recognition device.

As shown in FIG. 7, a computer system suitable for implementing the object recognition device 620 in the object recognition system 600 provided by the above-described embodiment includes a Central Processing Unit (CPU), which can perform various appropriate actions and processes according to a program stored in a Read-Only Memory (ROM) or a program loaded from a storage section into a Random Access Memory (RAM). In the RAM, various programs and data necessary for the operation of the computer system are also stored. The CPU, ROM and RAM are connected by a bus. An Input/Output (I/O) interface is also connected to the bus.

The following components are connected to the I/O interface: an input part including a keyboard, a mouse, etc.; an output part including a Liquid Crystal Display (LCD) and a speaker; a storage part including a hard disk, etc.; and a communication part including a network interface card such as an LAN card, a modem, and the like. The communication part performs communication processing via a network such as the Internet. The driver is also connected to the I/O interface as required. A removable medium, such as a magnetic disk, optical disk, magneto-optical disk, semiconductor memory, etc. is mounted on the driver as needed so that a computer program read therefrom is installed into the storage part as needed.

In particular, the processes described above in the flowcharts can be implemented as a computer software program. For example, the present embodiments include a computer program product including a computer program tangibly embodied on a computer-readable medium, and the computer program includes a program code for performing the method illustrated by the flowchart. In such embodiments, the computer program may be downloaded and installed from a network via the communications portion and/or installed from a removable medium.

The flowcharts and schematic diagrams in the figures illustrate the architecture, functionality, and operation of possible implementations of the systems, methods and computer program products of the present embodiments. In this regard, each block in the flowchart or schematic illustrations may represent a module, segment, or portion of code, which include one or more executable instructions for implementing the specified logical function. It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved. It will also be noted that each block of the schematic and/or flowchart illustrations, and combinations of blocks in the schematic and/or flowchart illustrations, can be implemented by special purpose hardware-based systems which perform the specified functions or operations, or combinations of special purpose hardware and computer instructions.

The modules described in this embodiment may be implemented in software or hardware. The described modules can also be provided in a processor, for example, can be described as: a processor including a computation module, a generation module, and a recognition module. The names of the modules do not in some cases constitute a limitation on the module itself. For example, the recognition module may also be described as an "object recognition module" or the like. Alternatively, the calculation module, the generation module and the recognition module may for example be respective calculation circuits, generation circuits and recognition circuits.

As another aspect, the present embodiment also provides a nonvolatile computer storage medium, which may be the nonvolatile computer storage medium included in the above-described device in the above-described embodiments, or may be a nonvolatile computer storage medium that exists separately and is not fitted into a terminal. The non-volatile computer storage medium stores one or more programs that, when executed by an apparatus, cause the apparatus to: acquire a first image; calculate depth information about the first image, and perform superpixel segmentation on the first image to obtain a superpixel image; generate three-dimensional image data of the first image according to the depth information and the image data of the superpixel image; and input the three-dimensional image data into a depth neural network for object recognition to obtain a recognition result.

It should be noted that in the description of the present disclosure, relational terms such as first and second, and the like may be used solely to distinguish one entity or action from another entity or action without necessarily requiring or implying any actual such relationship or order between such entities or actions. Furthermore, the terms "comprise", "comprising", or any other variation thereof, are intended to cover a non-exclusive inclusion, such that a process, method, article, or apparatus that includes a list of elements does not only include those elements but also include other elements not expressly listed or inherent to such process, method, article, or apparatus. An element defined by "comprises a" does not, without more constraints, preclude the existence of additional identical elements in the process, method, article, or apparatus that includes the element.

It is to be understood that the above-described embodiments of the present disclosure are merely illustrative of and not restrictive on the embodiments of the present disclosure, and that various other changes and modifications may be made by those skilled in the art based on the above description. Therefore, it is not intended to be exhaustive or to limit the present disclosure to the precise form disclosed, and all such changes and modifications are intended to be included within the scope of the present disclosure.

What is claimed is:

1. An object recognition method for recognizing an object from a first image, comprising:
   acquiring a first image;
   calculating depth information of the first image;
   performing superpixel segmentation on the first image, to obtain a superpixel image;
   generating three-dimensional image data of the first image according to the depth information and the image data of the superpixel image; and
   inputting the three-dimensional image data into a depth neural network for object recognition, to obtain a recognition result;
   wherein the performing the superpixel segmenting on the first image comprises:
   extracting a texture feature of a pixel point of the first image, and performing the superpixel segmentation on the first image according to the texture feature of the pixel point;
   wherein the performing the object recognition comprises:
   performing, by the depth neural network, multiple down-samplings on the inputted three-dimensional image data by using multiple down-sampling layers, and then performing, by the depth neural network, multiple up-samplings by using multiple up-sampling layers,
   wherein an input of a first up-sampling layer in the multiple up-sampling layers is a feature pattern obtained after performing at least one convolution operation on an output of a last one down-sampling layer, and an input of another up-sampling layer in the multiple up-sampling layers is a feature pattern obtained by splicing a feature pattern corresponding to the down-sampling layer corresponding to the other up-sampling layer and a feature pattern outputted by the previous up-sampling layer;
   wherein each of the multiple up-samplings comprises:
   performing interpolating up-sampling on one part of channels randomly selected from a feature pattern of an input up-sampling layer and performing up-sampling with transposed convolution on the other part of channels.

2. The object recognition method according to claim 1, wherein each of the multiple up-samplings comprises:
   performing the interpolating up-sampling on one half of channels randomly selected from a feature pattern of an input up-sampling layer and performing the up-sampling with the transposed convolution on the other half of channels.

3. The object recognition method according to claim 1, wherein the down-sampling layer comprises at least one convolution layer and one pooling layer; the first up-sampling layer in the multiple up-sampling layers comprises an interpolation module and a transposed convolution layer, and the other up-sampling layer comprises an interpolation module, a transposed convolution layer and at least one convolution layer.

4. The object recognition method according to claim 1, wherein the first image is acquired by a binocular camera, and the calculating the depth information of the first image comprises:
   calculating a depth value of each of coordinate points in the acquired first image according to an acquisition parameter of the binocular camera, and performing normalization processing on the depth values of all of the coordinate points to obtain depth information about the first image.

5. The object recognition method according to claim 1, further comprising:
   acquiring a training sample carrying a label, wherein the training sample is a superpixel image labeled with a target edge; and
   establishing a training set according to the training sample, and performing training by using the training set to obtain the deep neural network.

6. An object recognition system, comprising: an image acquisition device, a memory, a processor, and a computer program stored in the memory and capable of being executed by the processor, wherein the image acquisition device is configured for acquiring a first image, and the processor is configured to execute the computer program to implement steps of:
  calculating depth information of the first image;
  performing superpixel segmentation on the first image, to obtain a superpixel image;
  generating three-dimensional image data of the first image according to the depth information and the image data of the superpixel image; and
  inputting the three-dimensional image data into a depth neural network for object recognition, to obtain a recognition result;
  wherein the performing the superpixel segmenting on the first image comprises:
  extracting a texture feature of a pixel point of the first image, and performing the superpixel segmentation on the first image according to the texture feature of the pixel point;
  wherein the performing the object recognition comprises:
  performing, by the depth neural network, multiple down-samplings on the inputted three-dimensional image data by using multiple down-sampling layers, and then performing, by the depth neural network, multiple up-samplings by using multiple up-sampling layers,
  wherein an input of a first up-sampling layer in the multiple up-sampling layers is a feature pattern obtained after performing at least one convolution operation on an output of a last one down-sampling layer, and an input of another up-sampling layer in the multiple up-sampling layers is a feature pattern obtained by splicing a feature pattern corresponding to the down-sampling layer corresponding to the other up-sampling layer and a feature pattern outputted by the previous up-sampling layer;
  wherein each of the multiple up-samplings comprises:
  performing interpolating up-sampling on one part of channels randomly selected from a feature pattern of an input up-sampling layer and performing up-sampling with transposed convolution on the other part of channels.

7. The object recognition system according to claim 6, wherein the image acquisition device is a binocular camera.

8. The object recognition system according to claim 6, wherein each of the multiple up-samplings comprises:
  performing the interpolating up-sampling on one half of channels randomly selected from a feature pattern of an input up-sampling layer and performing the up-sampling with the transposed convolution on the other half of channels.

9. The object recognition system according to claim 6, wherein the down-sampling layer comprises at least one convolution layer and one pooling layer; the first up-sampling layer in the multiple up-sampling layers comprises an interpolation module and a transposed convolution layer, and the other up-sampling layer comprises an interpolation module, a transposed convolution layer and at least one convolution layer.

10. The object recognition system according to claim 6, wherein the first image is acquired by a binocular camera, and the calculating the depth information of the first image comprises:
  calculating a depth value of each of coordinate points in the acquired first image according to an acquisition parameter of the binocular camera, and performing normalization processing on the depth values of all of the coordinate points to obtain depth information about the first image.

11. The object recognition system according to claim 6, wherein the processor is further configured to execute the computer program to implement steps of:
  acquiring a training sample carrying a label, wherein the training sample is a superpixel image labeled with a target edge; and
  establishing a training set according to the training sample, and performing training by using the training set to obtain the deep neural network.

12. A non-transitory computer-readable storage medium having stored thereon a computer program, wherein the computer program is configured to be executed by a processor to implement the object recognition method according to claim 1.

13. The non-transitory computer-readable storage medium according to claim 12, wherein the performing the superpixel segmenting on the first image comprises:
  extracting a texture feature of a pixel point of the first image, and performing the superpixel segmentation on the first image according to the texture feature of the pixel point.

14. The non-transitory computer-readable storage medium according to claim 12, wherein the performing the object recognition comprises:
  performing, by the depth neural network, multiple down-samplings on the inputted three-dimensional image data by using multiple down-sampling layers, and then performing, by the depth neural network, multiple up-samplings by using multiple up-sampling layers,
  wherein an input of a first up-sampling layer in the multiple up-sampling layers is a feature pattern obtained after performing at least one convolution operation on an output of a last one down-sampling layer, and an input of another up-sampling layer in the multiple up-sampling layers is a feature pattern obtained by splicing a feature pattern corresponding to the down-sampling layer corresponding to the other up-sampling layer and a feature pattern outputted by the previous up-sampling layer.

* * * * *